United States Patent [19]

Yamada et al.

[11] Patent Number: 5,331,615
[45] Date of Patent: Jul. 19, 1994

[54] TRACKING CONTROL APPARATUS FOR AN OPTICAL DISK DEVICE

[75] Inventors: Shinichi Yamada, Osaka; Mitsuro Moriya, Ikoma; Masayuki Shibano; Hiroyuki Yamaguchi, both of Osaka, all of Japan

[73] Assignee: Matsushita Electric Industrial Co., Ltd., Osaka, Japan

[21] Appl. No.: 964,784

[22] Filed: Oct. 22, 1992

[30] Foreign Application Priority Data

May 11, 1991 [JP] Japan ................................. 3-288332
Oct. 23, 1991 [JP] Japan ................................. 3-275206

[51] Int. Cl.$^5$ .................................................. G11B 7/00
[52] U.S. Cl. ......................... 369/44.32; 369/44.27; 369/44.25; 369/54
[58] Field of Search ................ 369/44.32, 44.27, 44.11, 369/44.34, 44.35, 54, 44.33, 44.29, 120, 13, 44.25, 44.36; 360/77.03, 97.02, 114

[56] References Cited

U.S. PATENT DOCUMENTS

| | | | |
|---|---|---|---|
| 4,149,201 | 4/1979 | Card | 360/75 |
| 4,611,316 | 9/1986 | Takeuchi et al. | 369/44.32 |
| 4,769,806 | 9/1988 | Takamori | 369/44.21 X |
| 5,177,726 | 1/1993 | Terada | 369/44.34 X |
| 5,204,593 | 4/1993 | Ueki | 318/254 |

FOREIGN PATENT DOCUMENTS

| | | | |
|---|---|---|---|
| 0394572 | 10/1990 | European Pat. Off. | |
| 0247830 | 12/1985 | Japan | 369/44.32 |
| 62-170030 | 7/1987 | Japan | |

*Primary Examiner*—Aristotelis Psitos
*Assistant Examiner*—Thang V. Tran
*Attorney, Agent, or Firm*—Ratner & Prestia

[57] ABSTRACT

The temperature around the tracking actuator is detected with a temperature sensor, and the characteristics of an equivalent digital filter are changed to match the characteristics of the tracking actuator at the detected temperature. When the temperature is low, a current is applied to the focus control coil to raise the temperature of the tracking actuator, thereby essentially matching the transfer functions of the tracking actuator and the equivalent filter.

17 Claims, 11 Drawing Sheets

TRACKING CONTROL APPARATUS FOR AN OPTICAL DISK DEVICE

BACKGROUND OF THE INVENTION

1. Field of the Invention

The present invention relates to a tracking control apparatus for an optical disk device which records and reads data to/from a recording carrier having plural data tracks using an optical beam emitted from a semiconductor laser diode or other source.

2. Description of the Prior Art

FIG. 1 is a block diagram of a tracking control apparatus in a conventional optical disk device. The recording carrier 1, such as a disk, is mounted on the spindle of motor 2, and thereby driven at the rated speed. The signal is recorded to a spiral track imprinted to the recording carrier 1. The track width in this example is 0.6 $\mu$m wide, and the track pitch is 1.6 $\mu$m.

The optical beam 4 emitted from the light source 3, which is often a semiconductor laser diode, is modified to a parallel beam by the coupling lens 5, passed through the polarization beam splitter 6 and ¼ wavelength plate 7, and reflected by the total reflection mirror 8 which is mounted on a carrier 13. The reflected beam is then focused by the objective lens 10 on the recording carrier 1.

The objective lens 10 is mounted on a movable member 40 and the optical axis of the objective lens 10 is parallel to the shaft 51 to which the movable member 40 is rotatably and slidably mounted. The movable member 40 comprises bearings enabling it to move vertically along sliding motion shaft 51, which is mounted on a carrier 13, and can pivot from a neutral position, around the sliding motion shaft 51. The movable member 40 is mounted to the carrier 13 and a rubber 52 extends between the movable member 40 and the inside wall of carrier 13, so that the movable member 40 is biased to stay in the neutral position in which the optical axis of the optical beam 4 is aligned with the optical axis of the objective lens 10.

The carrier 13 is constructed so that it can move over the base 53 radially to the recording carrier 1. For the purpose of focus adjustment, the movable member 40 can be driven vertically along the sliding motion shaft 51 when current is applied to the coil 313 which is fixed to the movable member 40. When current is applied to the coil 313, an electromagnetic force is developed between the coil 313 and a permanent magnet (not shown) mounted on the carrier 13 to move the movable member 40 along the shaft 51.

When current is applied to the coil 14, which serves as a linear motor together with the permanent magnets (not shown) mounted on the base 53, the carrier 13 to which the total reflection mirror 8 and objective lens 10 are mounted moves radially to the recording carrier 1 due to the electromagnetic force developed between the coil 14 and the permanent magnets.

The movable member 40 is further constructed to pivot, by a very small amount, around the sliding motion shaft 51 from the neutral position against the biasing force of rubber 52 when a current is applied to the coil 89. The coil 89 is fixed to the movable member 40 and a permanent magnet (not shown) is provided on the carrier 13. When current is applied to the coil 89, the electromagnetic force developed between the coil 89 and the permanent magnet causes movable member 40 to pivot about shaft 51 by a small degree. This results in the pivotal movement of the objective lens 10 mounted on the movable member 40 in a direction substantially perpendicular to the track extending direction in the range of several hundred micrometers ($\mu$m), so as to control the tracking error (or track deviation error). Hereinafter, the assembly for moving the objective lens 10 in a direction perpendicular to the tracks, i.e., in the radial direction of the disk 1, by applying a current to coil 89 is referred to as the "tracking actuator."

The reflected light 9 from the recording carrier 1 passes the objective lens 10, is reflected by the total reflection mirror 8, passes the ¼ wavelength plate 7, and is reflected by the polarization beam splitter 6 into the detection lens 81. Part of the reflected light 9 passing the detection lens 81 is incident on the photodetector 303.

The photodetector 303 has a two part construction, and the output from each part is input respectively to the amplifiers 304, 305. The outputs from the amplifiers 304, 305 are input to the corresponding terminals of the differential amplifier 306, which outputs the difference signal of the two inputs.

This configuration forms a focus error signal detection system commonly known as the knife edge method, and results in a focus error signal indicating the offset between the recording carrier 1 and the focusing point of the optical beam 4 constricted by the objective lens 10. The focus is controlled by applying current to the coil 313 according to this focus error signal to drive the objective lens 10 up or down so that the focal point of the optical beam 4 is positioned on the recording carrier 1.

It is to be noted that the phase compensation circuit 307 is used to maintain an acceptable phase margin in the focus control system, and the drive circuit 311 is the power amplifying circuit.

The light source 3, coupling lens 5, polarization beam splitter 6, ¼ wavelength plate 7, detection lens 81, reflecting mirror 82, and photodetectors 11 and 303 are secured to the base 53 of the device. Part of the reflected light 9 passing the detection lens 81 is also incident on the other photodetector 11.

This photodetector 11 also has a two part construction, and the output from each part is input respectively to the amplifiers 16, 17. The outputs from the amplifiers 16, 17 are input to the corresponding terminals of the differential amplifier 18, which outputs the difference signal of the two inputs. The output of the differential amplifier 18 is used as the tracking error signal TE indicating the offset between the track and the optical beam 4 spot focused on the recording carrier 1. This configuration forms a detection system commonly called a "push-pull method."

The output signal from the differential amplifier 18 is input to the phase compensation filter 300, which corrects the phase of the tracking control system. The output of the phase compensation filter 300 is input to the power amplifying drive circuit 35 and equivalent filter 301. The drive circuit 35 supplies the current to the coil 89 according to the input signal. Thus, the movable member 40 pivots by an amount and in the direction determined by the TE signal from the neutral position against the biasing force of rubber 52. The objective lens 10 on the movable member 40 is thus shifted in the radial direction of the disk 1 by a small amount, in the order of several hundred micrometers, to correct the tracking error.

According to the push-pull method for correcting the deflection between the beam center and the track center, the objective lens 10 is pivoted by the pivotal movement of the movable member 40. However, when the objective lens 10 is pivoted by an amount determined by the tracking error signal TE, the optical axis of the objective lens 10 deviates from the optical axis of the beam entering the objective lens 10, resulting in a quasi-tracking error. To eliminate the quasi-tracking error, carrier 13 is moved in a similar manner to the pivotal movement of the movable member 40. To this end, equivalent filter 301 is provided which simulates the pivotal movement of the movable member 40 with respect to the tracking error signal TE.

The transfer function of the equivalent filter 301 is equivalent to the relationship of the displacement of the objective lens 10, mounted on the movable member 40, to the current supplied to the coil 89. In other words, the equivalent filter 301 is a simulator which gives an output equal to the amount and direction of the shift of the objective lens 10 in response to the input TE signal. The output of the equivalent filter 301, which is referred to as a simulation signal SS, expresses the displacement of the objective lens 10 for correcting the quasi-tracking error.

The transfer function of the equivalent filter 301 is determined by the amount of displacement of the objective lens 10 with respect to the input TE signal. Because rubber 52 is used to hold the movable member 40 in the neutral position, and the pivotal movement is effected against the rubber force, it is necessary to consider the characteristics of the rubber 52 in the transfer function. Since rubber 52 shown in FIG. 1 typically has both spring characteristics and viscosity, the transfer function has a quadratic form as shown in equation 1.

$$G = \frac{Kf}{m \times S \times S + D \times S + Ke} \quad (1)$$

where Ke is the spring constant, Kf is the thrust constant, D is the viscosity coefficient or the damping factor, m is the mass of the movable member 40, including the objective lens 10, and S is a Laplacian factor expressed in complex number. The equivalent filter 301 is thus an electrical circuit with the transfer function defined in equation (1).

The equivalent filter 301 produces the simulation signal SS indicative of pivotal movement of the objective lens 10 about the shaft 51, and the simulation signal is applied to the coil 14 of the linear motor through the phase compensation filter 302 and the drive circuit 36 to assure the phase margin of the carrier 13 control system. Therefore, the carrier 13 moves in the radial outward direction to move the objective lens 10 together with the carrier 13 to a position to counterbalance the quasi-tracking error, resulting such that the displacement of the optical axis of the objective lens 10 with respect to the aiming track becomes substantially zero.

It should be noted that the control band of the tracking actuator is typically approximately 2 kHz, and the control band of the carrier 13 is several hundred hertz.

The problem with this conventional tracking control apparatus is that the amount of pivotal movement of the objective lens 10 varies with respect to the temperature change, because the viscosity constant of the rubber varies with temperature. However, such a variation in the amount of the pivotal movement of the objective lens due to the temperature change is not effected in the equivalent filter 301. According to the prior art tracking control apparatus of FIG. 1, the equivalent filter 301 is designed to simulate the pivotal movement of the objective lens 10 at the fixed temperature, such as 20° C. Therefore, when the temperature of the rubber 52 changes from 20° C., the simulation signal SS as produced from the equivalent filter 301 is not equal to the actual pivotal movement of the objective lens 10. As a result, the high precision tracking control is not possible, and the control system becomes unstable the greater the temperature difference becomes.

SUMMARY OF THE INVENTION

Therefore, an object of the present invention is to provide a tracking control apparatus enabling stable tracking control even when the temperature changes.

To achieve this object, a tracking control apparatus for controlling the tracking of a track on a recording carrier by an optical beam comprises: a track offset detection means for detecting an offset between the optical beam focused on the recording carrier and the actual track position and producing a tacking error signal based on said offset; a first shifting means for shifting, by a small amount from a neutral position, said optical beam focused on the recording carrier in a direction crossing the tracks, said first shifting means being applied with a biasing force to return to said neutral position; a first driving means, responsive to said tracking error signal, for driving said first shifting means against said biasing force to cancel said offset, but yielding a quasi-tracking error; a temperature detection means for detecting the temperature of said first shifting means; a simulation means for simulating the movement of said first shifting means and producing a simulation signal indicative of movement of said first shifting means; a control means for controlling said simulation means to change the simulation signal relatively to the temperature of said first shifting means as detected by said temperature detecting means; a second shifting means for shifting said first shifting means in a direction crossing the tracks; and a second driving means, responsive to said simulation signal, for driving said second shifting means to cancel said quasi-tracking error.

BRIEF DESCRIPTION OF THE DRAWINGS

The present invention will become more fully understood from the detailed description given below and the accompanying diagrams wherein.

DESCRIPTION OF PREFERRED EMBODIMENTS

Figure 1:
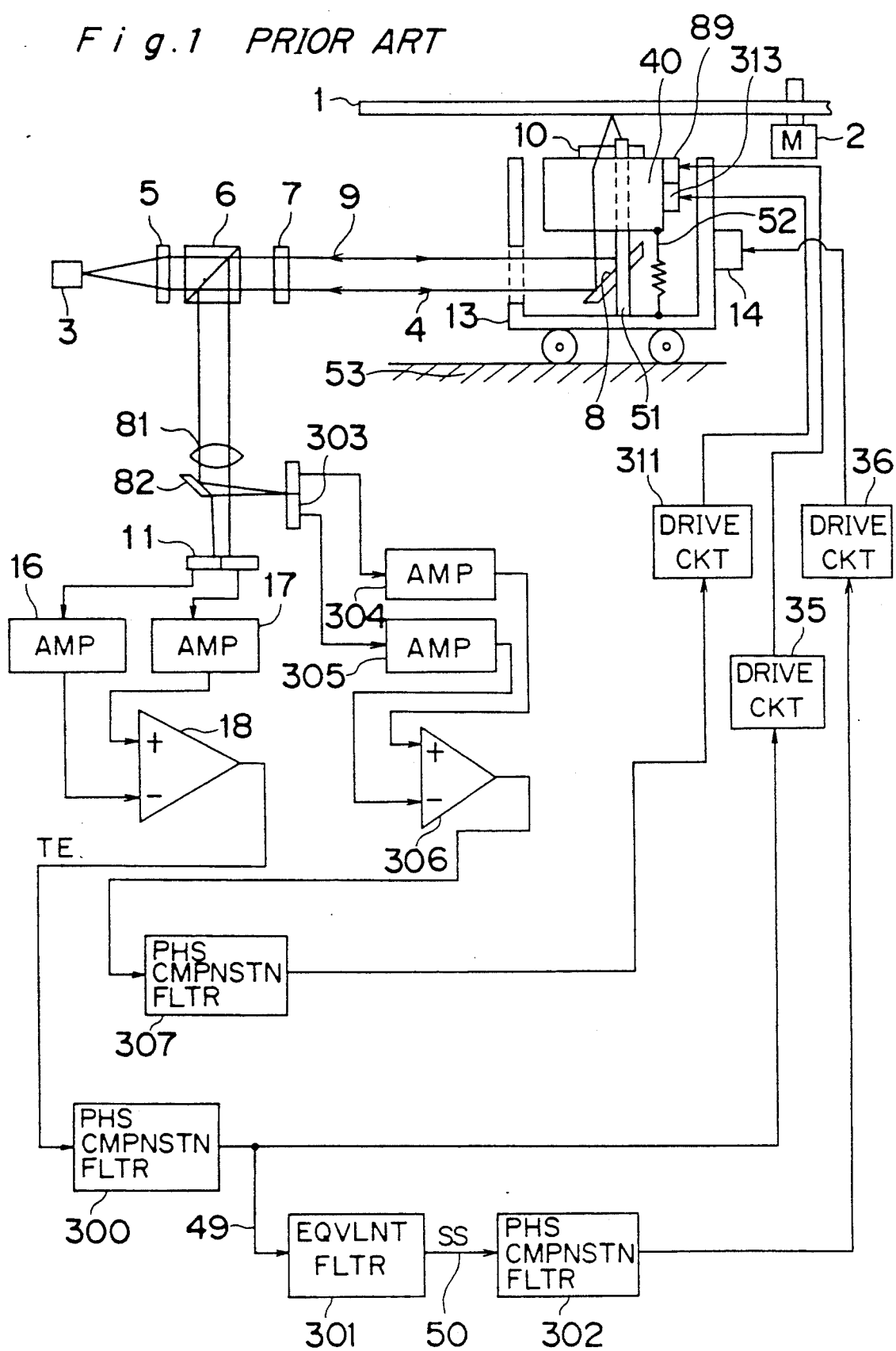
FIG. 1 is a block diagram used to described the tracking control apparatus of a conventional optical disk device.
Figure 2:
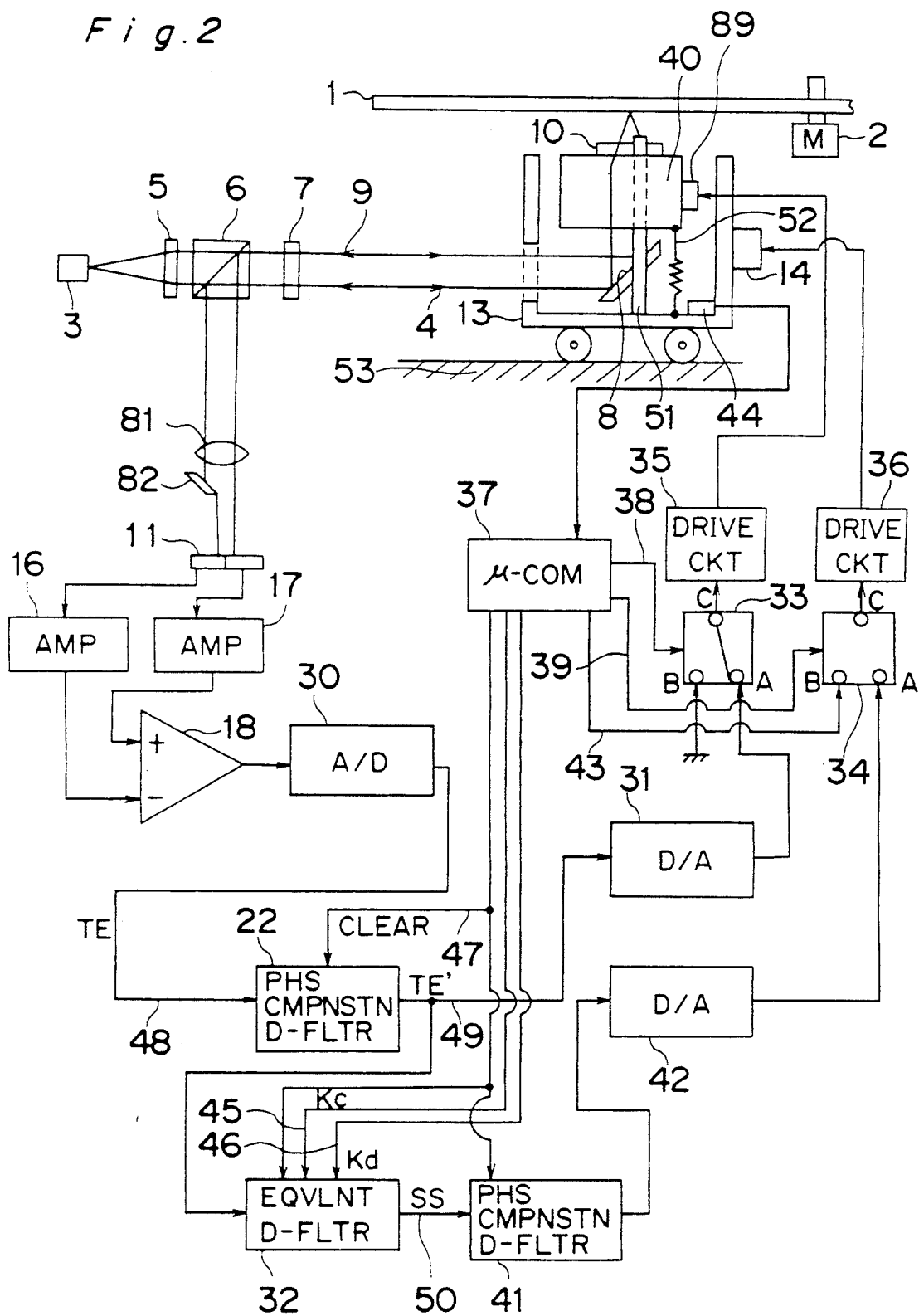
FIG. 2 is a block diagram of a tracking control apparatus according to the first embodiment of the present invention.

The preferred embodiments of a tracking control apparatus according to the present invention are described below with reference to the accompanying figures, of which FIG. 2 is a block diagram of a tracking control apparatus according to the first embodiment of the present invention. It is to be noted that like parts are indicated by like reference numbers in FIGS. 1 and 2, and further description is omitted below.

The output signal from the differential amplifier 18 is applied to the analog/digital (A/D) converter 30, which converts the analog signal to a digital signal. The output signal from the A/D converter 30, which is the tracking error signal TE in the digital form, is applied to the digital phase compensation filter 22 for compensation of the tracking control system phase. The output signal TE' of digital phase compensation filter 22 is then applied to the digital/analog (D/A) converter 31, which converts the digital signal to an analog signal, and to the equivalent digital filter 32.

The output signal from the D/A converter 31 is applied to the input terminal A of the switch 33, the signal level of the other input terminal B of which is set to zero (ground level). The output terminal C of the switch 33 is connected to the drive circuit 35. The drive circuit 35 applies a current to the coil 89 to control the pivotal movement of the objective lens 10 about shaft 51.

A temperature detector 44 for detecting the temperature of the rubber 52 is provided in the carrier 13. The detected temperature is applied to a microcomputer 37.

Microcomputer 37 produces, during the tracking control operation, a control signal through line 38 to switch 33 so that the input terminal A and output terminal C of the switch 33 are connected. The objective lens 10 is thus driven by a current that follows the TE signal, and the optical beam 4 focused on the recording carrier 1 is controlled to accurately track the data track on the carrier.

Microcomputer 37 also produces, during the tracking control operation, coefficients Kc and Kd along lines 45 and 46 to the equivalent digital filter 32.

The equivalent digital filter 32 is a digital filter with a transfer function equivalent to the relationship between the displacement of the objective lens 10 held on the movable member 40 to the drive current supplied to the coil 89. In other words, the equivalent filter 32 is a simulator which gives an output equal to the amount (in the order of several hundred micrometers) and direction of the pivotal movement of the objective lens 10 in response to the input TE signal. The output of the equivalent filter 32, which is the simulation signal SS, expresses the displacement of the objective lens 10 for correcting the tracking error. Because the amount of the pivotal movement of the objective lens 10 held on the movable member 40 varies with the temperature, as was described with respect to the prior art above, the present invention is constructed to change the characteristics of the transfer function of the equivalent digital filter 32 by changing the coefficients Kc and Kd according to the change in temperature. Thus, by detecting the temperature and changing the equivalent digital filter 32 transfer function, the simulation signal SS continues to accurately express the displacement of the objective lens 10 when the temperature changes.

According to the first embodiment, the microcomputer 37 produces the coefficients Kc and Kd shown in Table 1 below for the two different temperature ranges.

TABLE 1

| Temp Range | Kc | Kd | Mp | IRF |
|---|---|---|---|---|
| above 12.5° C. | 1.976563 | −0.980957 | 11 dB | 80 Hz |
| below 12.5° C. | 1.920898 | −0.926270 | 1 dB | 90 Hz |

Note: IRF stands for the intrinsic resonance frequency and Mp is the gain at the IRF.

For the first temperature range (above 12.5° C.), coefficients Kc and Kd are selected as those obtained when the temperature of the rubber 52 is 25° C., and for the second temperature range (below 12.5° C.), coefficients Kc and Kd are selected as those obtained when the temperature of the rubber 52 is 10° C. More narrow ranges can be selected.

The output from the equivalent digital filter 32 is applied to the input terminal A of the switch 34 through the digital phase compensation filter 41, which corrects the phase of the carrier 13 control system, and the D/A converter 42. Switch 34 has input terminals A and B which are connected to D/A converter 42 and microcomputer 37, respectively, and an output terminal C which is connected the drive circuit 36.

The drive circuit 36 supplies current to the coil 14 according to the input signal. When tracking control is applied, the output signal from the microcomputer 37 is applied to the switch 34 through line 39 so that the input terminal A and output terminal C are connected. The carrier 13 is thus controlled to move in the radial direction of the disk 1 with hardly any tracking error.

The microcomputer 37 reads the temperature data from the temperature sensor 44, and changes the equivalent digital filter 32 transfer function, i.e., the coefficients Kc and Kd, according to Table 1. The coefficients Kc and Kd are applied to the equivalent digital filter 32 via the lines 45 and 46.

When the equivalent digital filter 32 transfer function is changed during the tracking control operation, transient control errors are amplified because the output of the digital filter does not change smoothly. The transfer function is therefore changed during the seek operation when tracking control is inoperative. In addition, when tracking control is temporarily made inactive, the delay circuit of each digital filter clears the values held before seeking began. By clearing these values, operating errors in the control system caused by the retained pre-seek values are avoided when tracking control is started again after seeking is completed. The clear command is effected by the microcomputer 37 setting the line 47 to a HIGH level.

The seek operation is performed by connecting the input terminal B and the output terminal C of switch 33, the input terminal B and the output terminal C of switch 34, and the microcomputer 37 outputting data to the input terminal B of switch 34. The carrier 13 travels because of the current applied to the coil 14 by the drive circuit 36 according to the output signal from the microcomputer 37. The seek operation thus results because the microcomputer 37 outputs a signal that causes the carrier 13 to travel in the direction of the target (sought) track. The seek operation is repeated frequently under normal optical disk drive usage, and is therefore minimally affected by temperature and other factors that change slowly with time.

Figure 3:
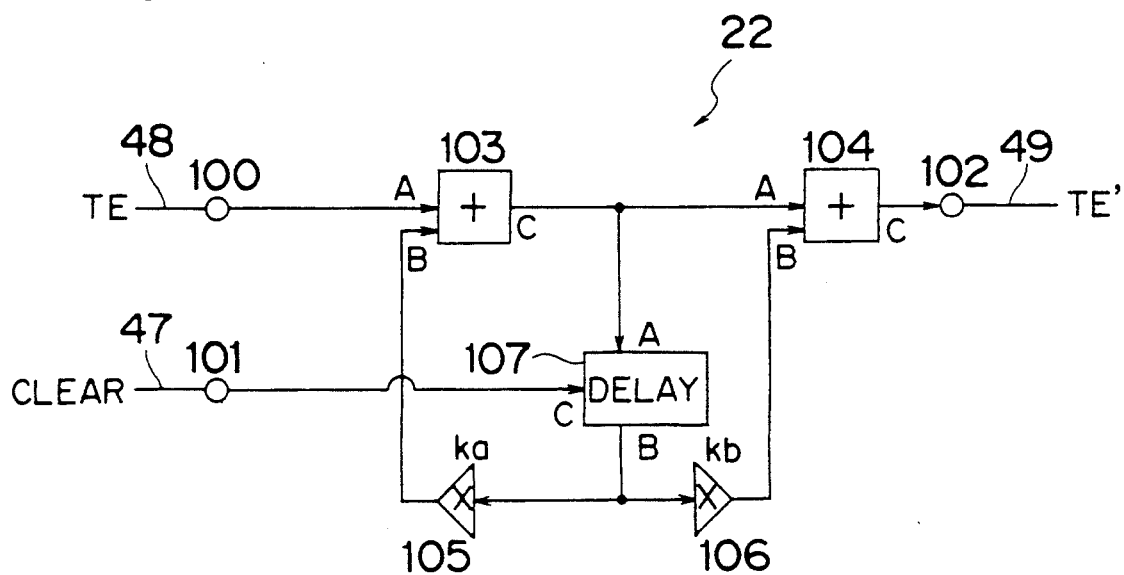
FIG. 3 is a block diagram of the digital phase compensation filter used in the first embodiment.

Referring to FIG. 3, a detail of the digital phase compensation filter 22 is shown. The input terminals 100, 101 and the output terminal 102 are connected to the lines 48, 47, and 49, respectively, shown in FIG. 2. Adders 103 and 104 and the digital signals applied to input terminals A and B, and the added result is produced from output terminal C. Multipliers 105 and 106 multiply the input digital signals by constants Ka and Kb, respectively, and output the results. It is to be noted that the multipliers and adders operate at a predetermined sampling cycle Ts.

The delay circuit 107 delays the input digital signal by the sampling cycle Ts before outputting the signal to output terminal B. When a CLEAR signal (HIGH) is applied to input terminal C, the delay circuit 107 clears the stored values. The values are cleared in the delay circuit 107 only during the seek period, that is when tracking control is inactive. As described above, this is to prevent control system operating errors caused by the stored pre-seek values when tracking control is started again after the seek operation is completed.

Figure 4:
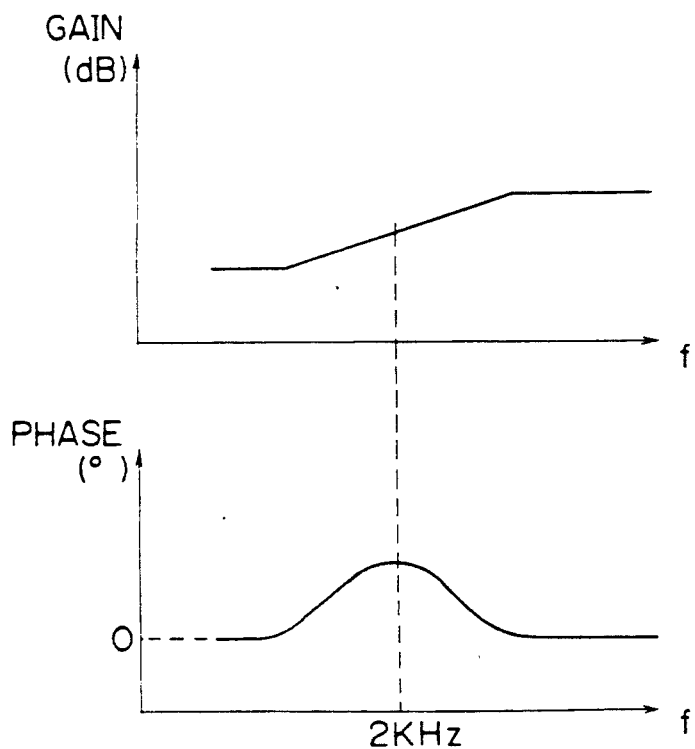
FIG. 4 is a graph of the characteristics of the digital phase compensation filter shown in FIG. 3.

The digital filter shown in FIG. 3 is generally known as a direct form of a primary digital filter, and can achieve a phase compensation filter to compensate the phase margin of the control system by setting Ka and Kb to predetermined values. The corresponding characteristics are shown in FIG. 4. Characteristic (a) is the gain, and (b) is the phase. The frequency is shown on the axis of the abscissas for both characteristics. Gain is expressed in decibels (dB), and frequency as a logarithm. The gain intersection of the tracking control system is usually approximately 2 kHz, and the characteristics are defined so that the phase advances at around 2 kHz.

Figure 5A:
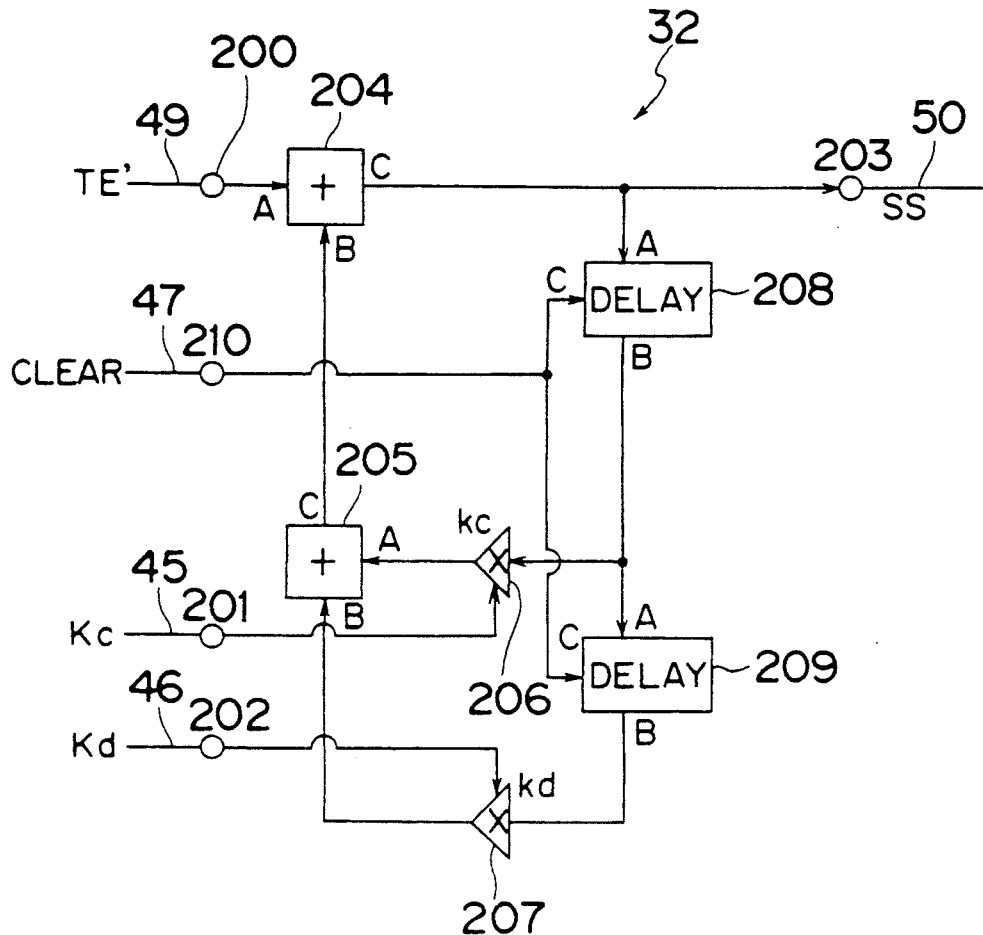
FIG. 5a is a block diagram of an equivalent digital filter used in the first embodiment.

Referring to FIG. 5a, a detail of the equivalent digital filter 32 is shown. The input terminal 200 is connected to line 49 (FIG. 2) for receiving the tracking error signal TE'. Input terminals 201 and 202 are connected to lines 45 and 46, respectively, for receiving the coefficients Kc and Kd, and input terminal 210 to line 47 for receiving the CLEAR signal. The output terminal 203 is connected to line 50 for producing the simulation signal SS. Adders 204 and 205 add the digital signals applied to input terminals A and B, and output the result to output terminal C. Multipliers 206 and 207 multiply the input digital signals by coefficients Kc and Kd, respectively, and output the results. Coefficients Kc and Kd are set by the microcomputer 37 via input terminals 201 and 202. It is to be noted that the multipliers and adders operate at a predetermined sampling cycle Ts.

The delay circuits 208, 209 delay the digital signal applied to input terminal A by the sampling cycle Ts before outputting the signal to output terminal B. When input terminal C is HIGH, the delay circuits 208, 209 clear the stored values. The values are cleared in the delay circuits 208, 209 only during the seek period when tracking control is inactive. This is for the same reason as described with respect to the digital phase compensation filter 22 above.

The digital filter shown in FIG. 5a is generally known as a quadratic digital filter, and can achieve the transfer function defined by equation (1) in the description of the prior art by setting coefficients Kc and Kd to appropriate predetermined values, such as shown in Table 1.

Figure 5B:
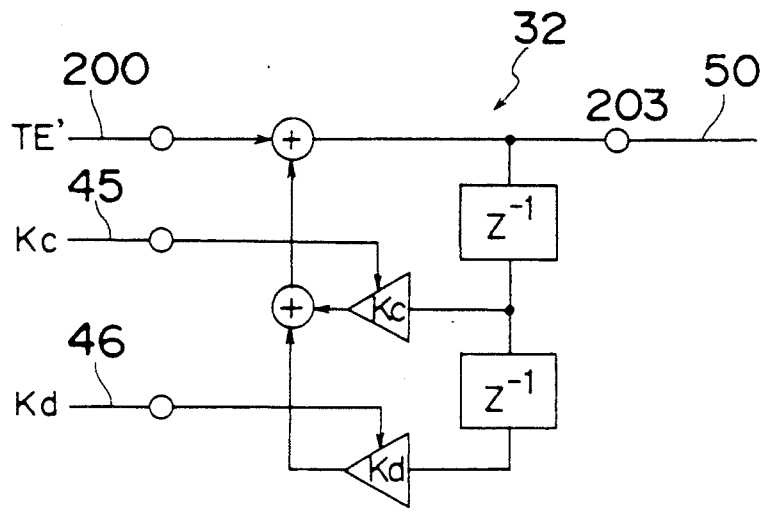
FIG. 5b is a block diagram of the equivalent digital filter of FIG. 5a, but depicted using Z parameter.

When the equivalent digital filter 32 of FIG. 5a is expressed by Z parameter, the delay circuits are can be expressed as $Z^{-1}$ as shown in FIG. 5b.

Figure 6B:
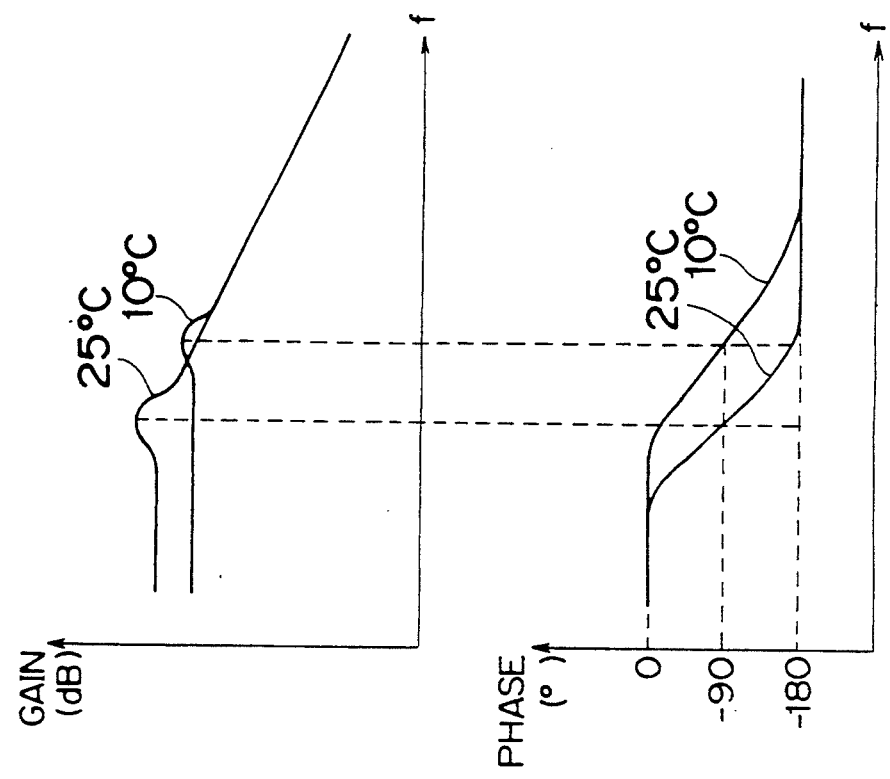
FIG. 6b is a graph of the characteristics of the equivalent digital filter of FIG. 5a, FIG. 7 is a block diagram of a tracking control apparatus according to the second embodiment of the present invention.
Figure 6A:
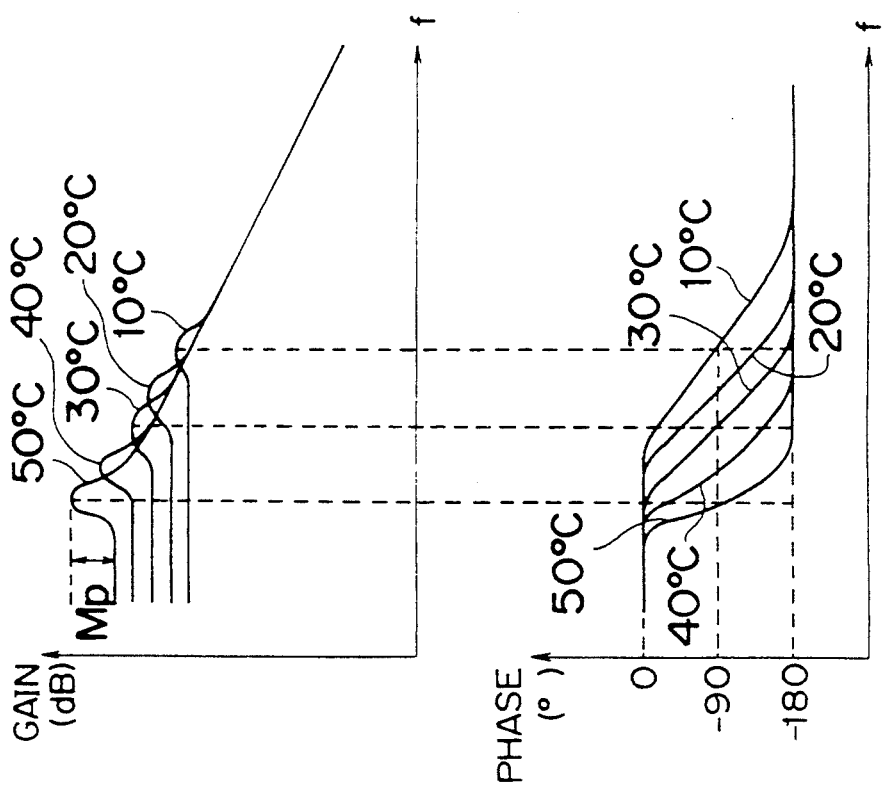
FIG. 6a is a graph of the characteristics of the tracking actuator used in the first embodiment.

Referring to FIG. 6a, gain characteristics and phase characteristics obtained by the pivotal movement of the objective lens 10 with respect to the drive current supplied to the coil 89 at various temperatures are shown. The frequency is shown on the axis of the abscissas for both characteristics. Gain is expressed in decibels (dB), and frequency as a logarithm. When the temperature of rubber 52 is low, such as 10° C., the rubber 52 is rather stiff so that the viscosity is high. Thus, the gain is relatively low and the phase changes at relatively high frequency. When the temperature of rubber 52 becomes high, the rubber 52 becomes less stiff so that the viscosity is reduced. Thus, the gain increases at the lower frequency and the phase changes from the lower frequency regions. In general, as the temperature rises, the intrinsic resonance frequency IRF drops and the gain Mp rises.

In Table 1, the coefficients Kc and Kd for the first temperature range (above 12.5° C.) are so selected that the equivalent digital filter 32 simulates the pivotal movement of the objective lens 10 when the rubber temperature is 25° C. And, the coefficients Kc and Kd for the second temperature range (below 12.5° C.) are so selected that the equivalent digital filter 32 simulates the pivotal movement of the objective lens 10 when the rubber temperature is 10° C. In FIG. 6b, gain characteristics and phase characteristics at rubber temperatures of 25° C. and 10° C. are shown.

As a result, the transfer function of the equivalent digital filter 32 and the transfer function of the tracking actuator can be essentially matched even when the temperature changes by changing the coefficients Kc and Kd of the equivalent digital filter 32 according to the output of the temperature sensor 44.

The digital phase compensation filter 41 used for phase compensation of the carrier 13 control system is constructed identically to the digital phase compensation filter 22 of the tracking control system, and further description is therefore omitted. It is to be noted that the gain intersection of the carrier 13 control system is usually around several hundred hertz, and the characteristics are defined so that the phase advances in that range.

It is to be noted that the present embodiment changes the transfer function of the equivalent digital filter 32 in two steps according to the detected temperature, but more steps can also be defined in the narrower temperature ranges for obtaining stable control system operation.

Figure 7:
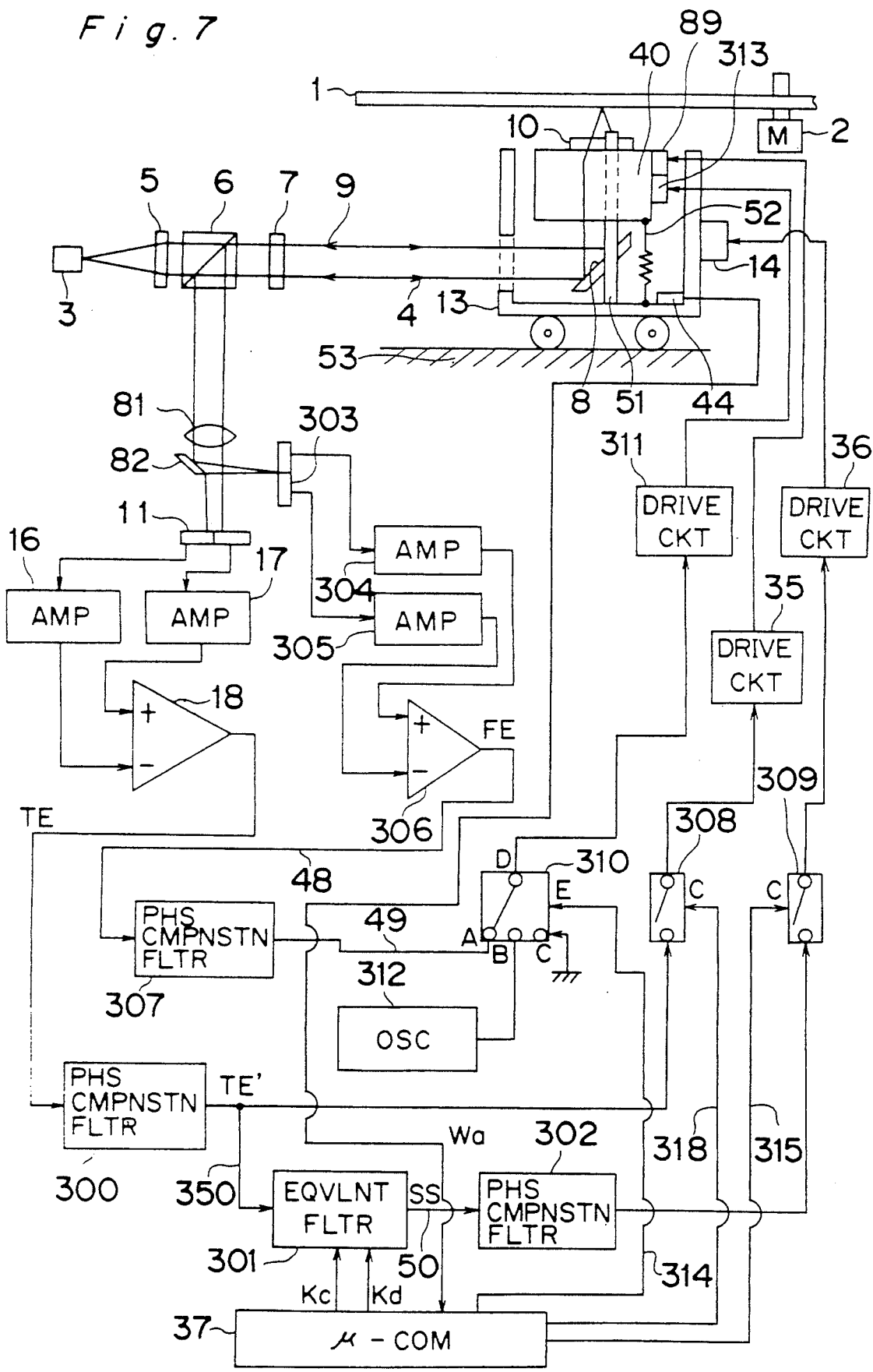

Referring to FIG. 7, a tracking control apparatus according to a second embodiment of the invention is shown. It is to be noted that like parts are indicated by like reference numbers in FIGS. 1 and 7, and further description is omitted below.

According to the second embodiment, the tracking control apparatus further has, when compared with the first embodiment, switches 308, 309 and 310, an oscillator 312.

Switches 308 and 309 are used to switch tracking control and carrier 13 control on/off, respectively, and close when the control terminal C is HIGH. The control terminals C of switches 308 and 309 are connected to the microcomputer 37. The oscillator 312 generates a sine wave of a predetermined frequency, and outputs the wave to the input terminal B of switch 310. The output signal from the phase compensation circuit 307 in the focus control system is applied to input terminal A of the switch 310. Input terminal A and output terminal D of the switch 310 are connected when control terminal E is HIGH, input terminal C and output terminal D are connected when LOW, and input terminal B and output terminal D are connected when a middle level. Control terminal E is connected to the microcomputer 37 through the line 314. A zero level signal is applied to input terminal C.

The temperature sensor 44 measures the temperature Wa of the rubber 52. The temperature data Wa is output from the temperature sensor 44 and is applied to the microcomputer 37.

The microcomputer 37 obtains the temperature data Wa from the temperature sensor 44 before carrying out focus control.

In this embodiment, it is assumed that the initially obtained temperature data Wa is 5° C. It is empirically found that when the rubber temperature is less than a limit temperature, such as 7.5° C., the viscosity of the rubber becomes so low that the tracking error control can not be carried out properly. Thus, the phase compensation filter 302 is designed to simulate the pivotal movement of the objective lens 10 when the rubber temperature is equal to or greater than the limit temperature (7.5° C.) to assure stability in the control system and a sufficient phase margin using the transfer characteristics of the tracking actuator. The phase margin of the carrier 13 control system cannot be assured at the transfer characteristics of the tracking actuator when the rubber 52 temperature is below the limit temperature, 7.5° C.

Thus, according to the second embodiment, the microcomputer 37 controls the tracking control apparatus in three different temperature ranges as shown in Table 2.

TABLE 2

| Temp Range | Kc | Kd | Mp | IRF | Treat |
|---|---|---|---|---|---|
| above 12.5° C. | 1.976563 | −0.980957 | 11 dB | 80 Hz | |
| 7.5-12.5° C. | 1.920898 | −0.926270 | 1 dB | 90 Hz | |
| below 7.5° C. | — | — | — | — | heat |

Note: IRF stands for the intrinsic resonance frequency and Mp is the gain at the IRF.

When the rubber temperature Wa is below the limit temperature, 7.5° C., the microcomputer 37 sets the line 314 to a middle level for a period Tb. According to a preferred embodiment, the period Tb is made variable such that when the rubber temperature Wa is below a lower limit temperature, such as 2.5° C., Tb is set equal to 10 seconds and when Wa is between the lower and upper limit temperatures, such as between 2.5° C. and 7.5° C., Tb is set equal to 5 seconds.

When line 314 is at the middle level, switch 310 is turned to connect terminals B and D. Thus, a sine wave current at a level dependent upon the output signal of the oscillator 312 is applied to the focus control coil 313. Thus, the temperature of coil 313 rises because of the applied current, causing the temperature of the movable member 40 and the rubber 52 mounted on the movable member 40 to rise. The applied current time, in this case 5 seconds, and current level are set sufficient for the rubber 52 temperature to rise from 5° C. to above 7.5° C., such as to 8.0° C. Thereafter, the line 314 is set HIGH to connect terminals A and D in switch 310 to carry out the focus control. Then, the microcomputer 37 provides coefficients Kc and Kd to equivalent filter 301 at values shown in Table 2 in accordance with the detected temperature i.e., in the above example 8.0° C. Thereafter, control lines 318 and 315 are set HIGH to turn on switches 308 and 309 to carry out the tracking control and carrier 13 control.

During the focus control and tracking control periods when the temperature of the rubber 52 increases such as to 13° C. because of the heat generated by the current applied to the coils 313 and 89, the microcomputer 37 provides coefficients Kc and Kd in the higher temperature range shown in Table 2. As a result, the phase margin of the carrier 13 control system can be assured, which means the stability of the tracking control system is also assured.

Figure 8:
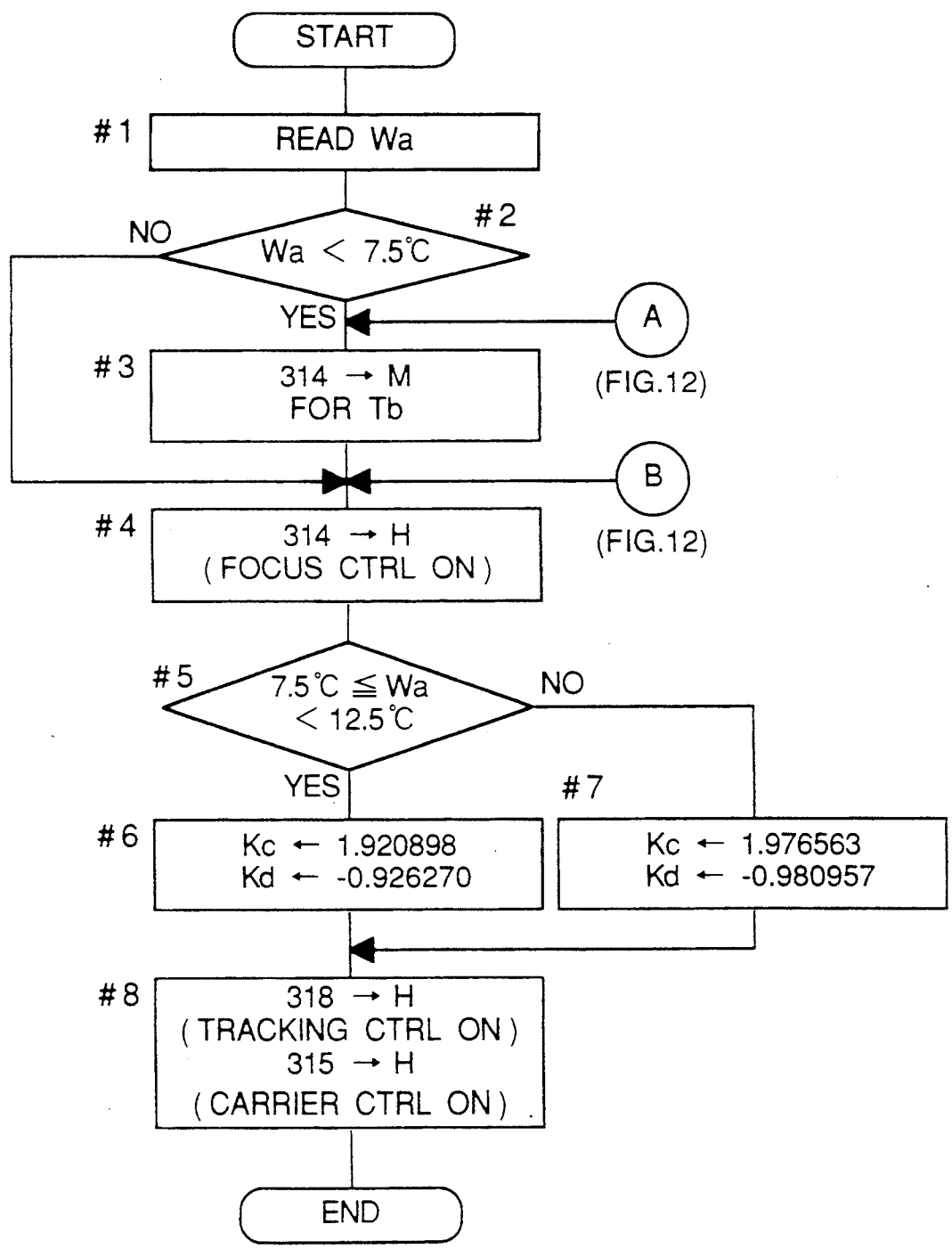
FIG. 8 is a flow chart of the control sequence executed by the microcomputer in the second embodiment of the invention.

The control sequence of the microcomputer 37 is shown in FIG. 8.

At step #1, temperature Wa is read. At step #2, it is detected whether or not the temperature Wa is less than 7.5° C. If not, the program advances to step #4, but if yes, step #3 is carried out to set the line 314 to the middle level to provide the sine wave to coil 313 for a set time Tb and then, the program goes to step #4. At step #4, line 314 is set to HIGH to carry out the focus control. At step #5, it is detected whether the temperature Wa is between 7.5° C. and 12.5° C. If yes, coefficients Kc and Kd are set such that Kc=1.920898 and Kd=−0.926270 (step #6), and if not, coefficients Kc and Kd are set such that Kc=1.976563 and Kd=−0.980957 (step #7), as indicated in Table 2. Then, at step #8, lines 318 and 315 are set to HIGH to carry our the tracking control and the carrier control.

Figure 9:
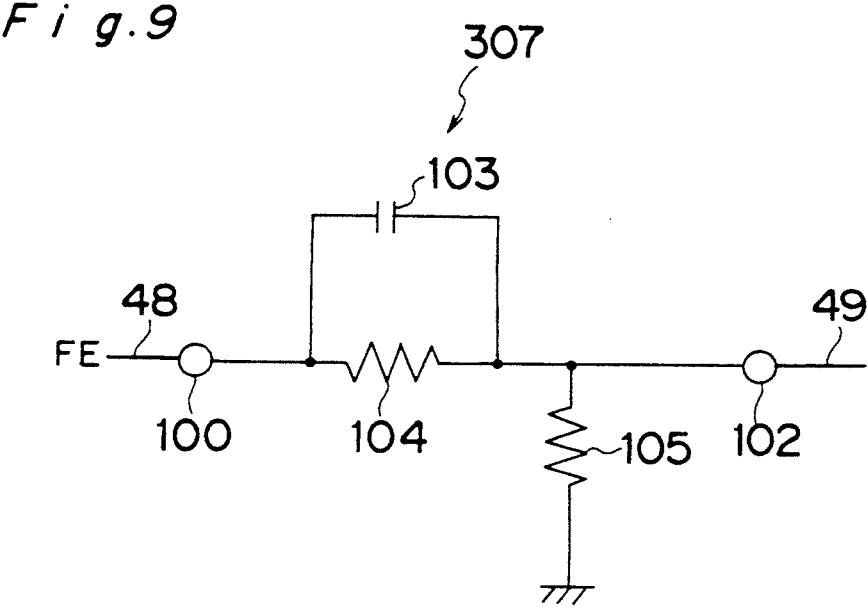
FIG. 9 is a block diagram of the phase compensation filter used in the second embodiment.
Figure 10:
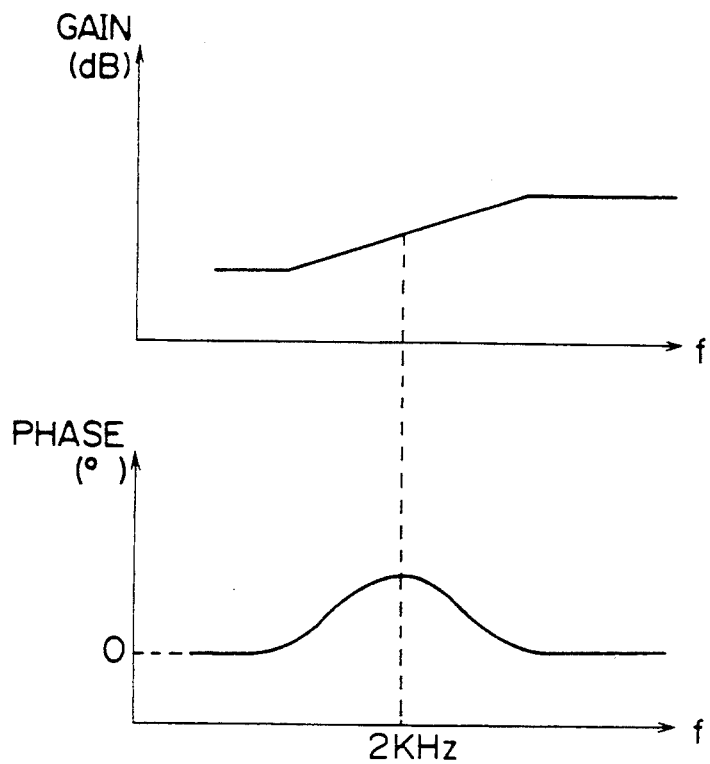
FIG. 10 is a graph of the characteristics of the phase compensation filter of FIG. 9.

Referring to FIG. 9, a detail of the phase compensation circuit 307 is shown. The input 100 and output 102 terminals are connected to lines 48 and 49, respectively. The phase advance characteristics required to assure the phase margin of the focus control system can be achieved by appropriately adjusting the capacitor 103 and resistors 104 and 105. These characteristics are shown in FIG. 10.

Characteristic (a) is the gain, and (b) is the phase. The frequency is shown on the axis of the abscissas for both characteristics. Gain is expressed in decibels (dB), and frequency as a logarithm. The gain intersection of the focus control system is usually approximately 2 kHz, and the characteristics are adjusted so that the phase advances at around 2 kHz.

The configuration and operation of the tracking control phase compensation filter 300 and the phase compensation filter 302 used for phase compensation of the carrier 13 control system are essentially identical to those of the focus control phase compensation circuit 307, and further description is therefore omitted. It is to be noted that the gain intersection or cross over frequency of the carrier 13 control system is usually around several hundred hertz, and the characteristics are defined so that the phase advances in that range.

According to one modification of the second embodiment, it is possible to eliminate the temperature detector 44 and to heat the rubber 52 in response to the initial power supply to the tracking control apparatus. According to this modification, the rubber 52 is always heated to a temperature greater than the predetermined limit temperature before starting the operation.

Figure 11:
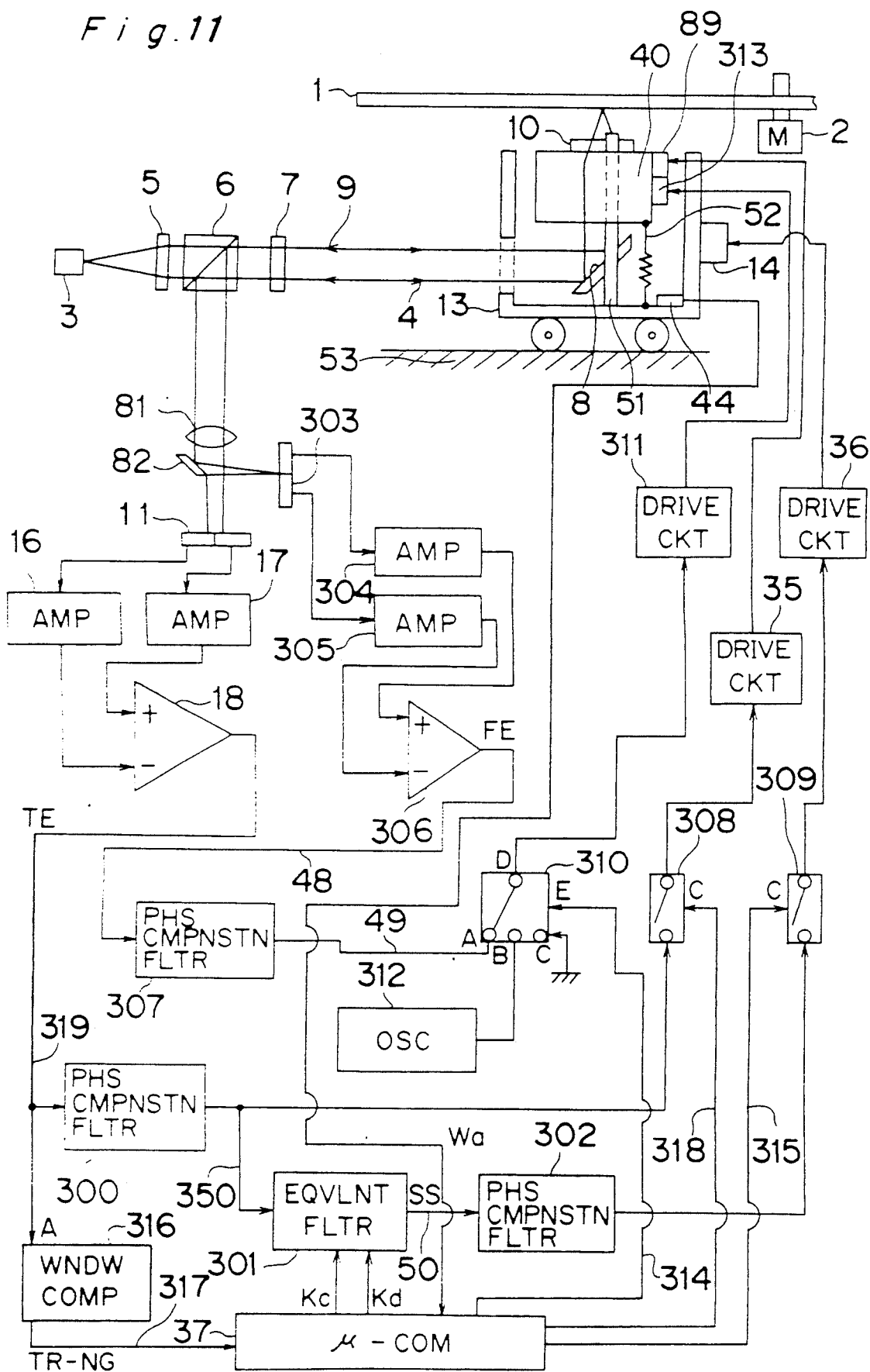
FIG. 11 is a block diagram of a tracking control apparatus according to the third embodiment of the present invention.

Referring to FIG. 11, a tracking control apparatus according to a third embodiment of the invention is shown. It is to be noted that like parts are indicated by like reference numbers in FIGS. 1, 7, and 11, and the description for the same parts is omitted.

When compared with the second embodiment shown in FIG. 7, the third embodiment further has a window comparator 316 which detects whether the TE signal level is within a predetermined range. In other words, the window comparator 316 determines whether the tracking control and the carrier control are operating normally, or not, based on the TE signal. The output signal TR-NG of the window comparator 316 is applied to the microcomputer 37.

Furthermore, according to the third embodiment, the temperature sensor 44 can be less accurate in operation and less expensive than that may be used in the first or second embodiment.

When an expensive temperature sensor 44 is used, a high accuracy temperature detection can be obtained, but results in bulky size and high manufacturing cost. Furthermore, it may be difficult to detect the temperature of the very close surrounding atmosphere of the rubber 52 due to the bulky size. In the third embodiment, a thermistor which changes its resistance relatively to the temperature change is used for the temperature sensor 44. The accuracy of the thermistor is, for example, ±2 to 3° C. Furthermore, the characteristics of the rubber 52 also varies. Therefore, even when the temperature of the rubber 52 is detected as 5° C., the actual rubber temperature may be greater than 7.5° C. which is the border line to obtain the proper operation. Thus, it may be possible to properly carry out the tracking control and carrier control without heating the rubber 52. Since the heating takes 5 to 10 seconds, it takes unnecessary extra time to warm up the tracking control apparatus if the apparatus can properly operate without such a heating process, resulting in long waiting time to the user.

According to the third embodiment, the focus control, the tracking control and the carrier control are carried out first irrespective of the rubber temperature. Then, the degree of error in the tracking control and carrier control is detected. If the error is within the tolerable range, the control operation continues, but if not, then the control is ceased temporarily, and the heating process is inserted.

Referring back to FIG. 11, the tracking error signal TE is applied to the window comparator 316 which has a range determined by predetermined plus and minus threshold levels. When the tracking error signal TE is outside the range, window comparator 316 produces a HIGH level TR-NG signal indicating that the tracking control and carrier control are not carried out properly.

On the other hand, when the tracking error signal TE is within the range, window comparator 316 produces a LOW level TR-NG signal indicating that the tracking control and the carrier control are carried out properly.

Figure 12:
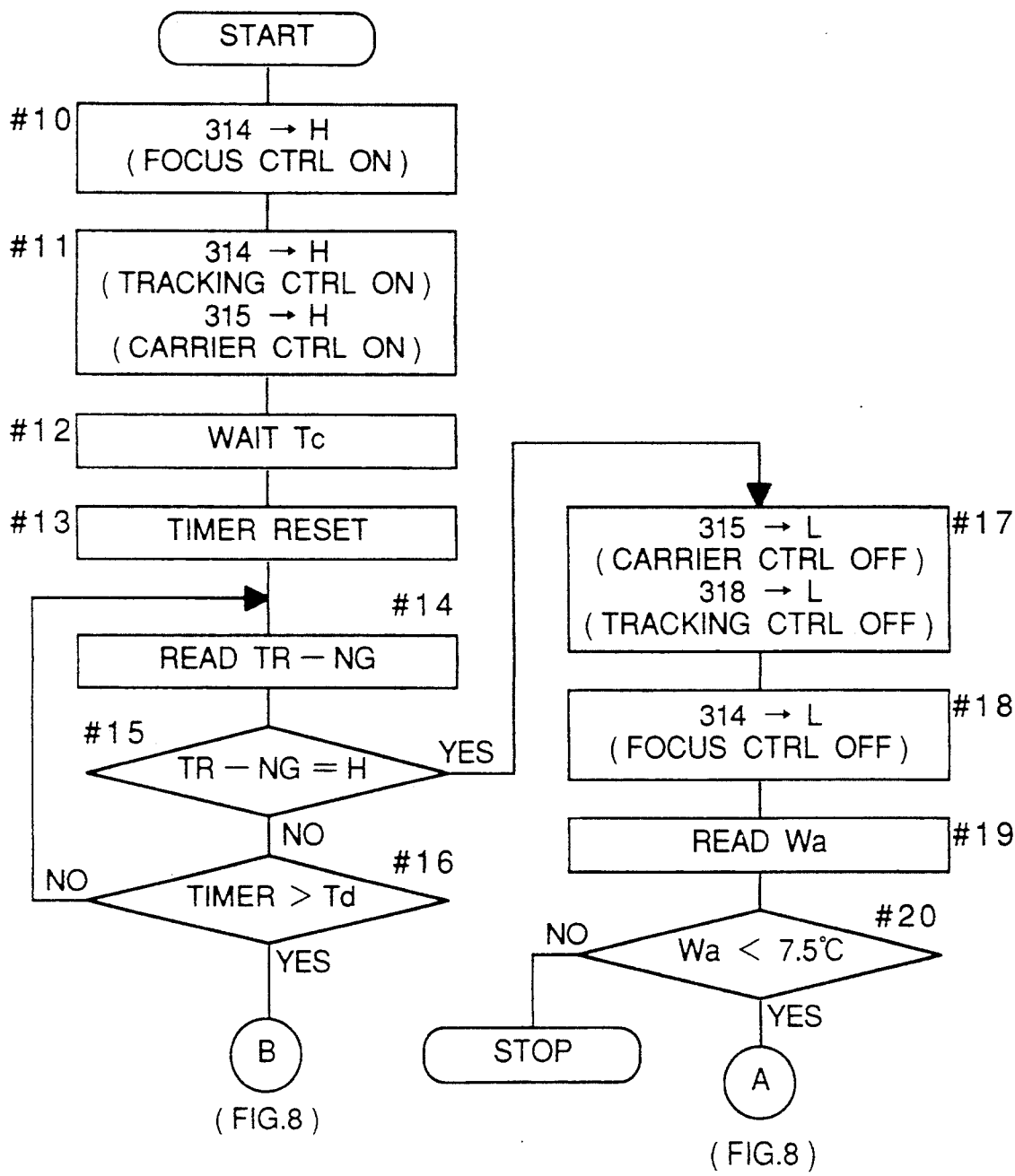
FIG. 12 is a flow chart of the control sequence executed by the microcomputer in the third embodiment of the invention.

Next, the operation of the microcomputer 37 is described with reference to the flow chart shown in FIG. 12.

Starting from step #10, line 314 is set to HIGH to start the focusing control. Then after 2 to 3 milliseconds, at step #11, lines 318 and 315 are set to HIGH to start the tracking control and carrier control. Then, after counting a predetermined time Tc, such as 2 to 3 milliseconds, the timer is reset (step #13) and then the signal TR-NG is read (step #14). If the signal TR-NG is LOW, the program goes to step #16, but if not, it goes to step #17. At step #16, it is detected whether a predetermined time Td, such as 3 to 5 milliseconds is elapsed. If the signal TR-NG continues to be LOW for a predetermined time Td, it is so judged that the tracking control and carrier control are carried out properly. In this case, the program goes to step #4 (FIG. 8) to continue the focusing control, tracking control and carrier control using appropriate coefficients Kc and Kd. If the signal TR-NG changes from LOW to HIGH before elapsing time Td, the program goes to step #17 so that lines 315 and 318 are set to LOW to terminate the carrier control and the tracking control. Then at step #18, line 314 is set to LOW to terminate the focusing control.

Then, at step #19, the rubber temperature Wa is read, and it is detected whether the temperature Wa is below the limit temperature, e.g., 7.5° C., or not. If no, it is so judged that the tracking control apparatus has some other error because the tracking control and carrier control are not properly carried out even if the temperature of rubber 52 is above the limit temperature (7.5° C.). In this case, the apparatus stop. On the other hand, if the detected temperature Wa is below the limit temperature (7.5° C.), the program goes to step #3 in FIG. 8 to heat the rubber 52 by providing the sine wave current to coil 313 for the predetermined time Tb, as described above.

Figure 13:
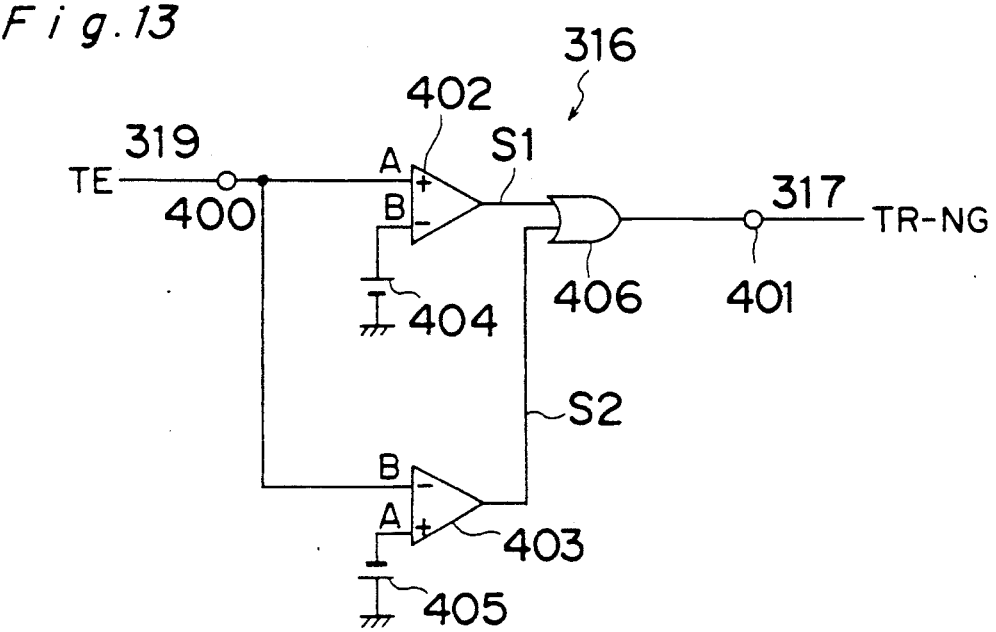
FIG. 13 is a block diagram of the window comparator used in the third embodiment of the invention.

Referring to FIG. 13, a detail of the window comparator 316 is shown. The input 400 and output 401 terminals are connected to lines 319 and 317, respectively. The input terminal 400 is further connected to terminal A of the comparator 402 and to terminal B of comparator 403. Terminal B of comparator 402 is connected to a +VH level of a power supply 404. Terminal A of comparator 403 is connected to a −VL level power supply 405.

When the terminal A is higher than the level of terminal B, comparators 402 and 403 output a HIGH signal to OR circuit 406. The OR circuit 406 outputs a HIGH signal to output terminal 401 if either or both of the input signals is HIGH.

Figure 14:
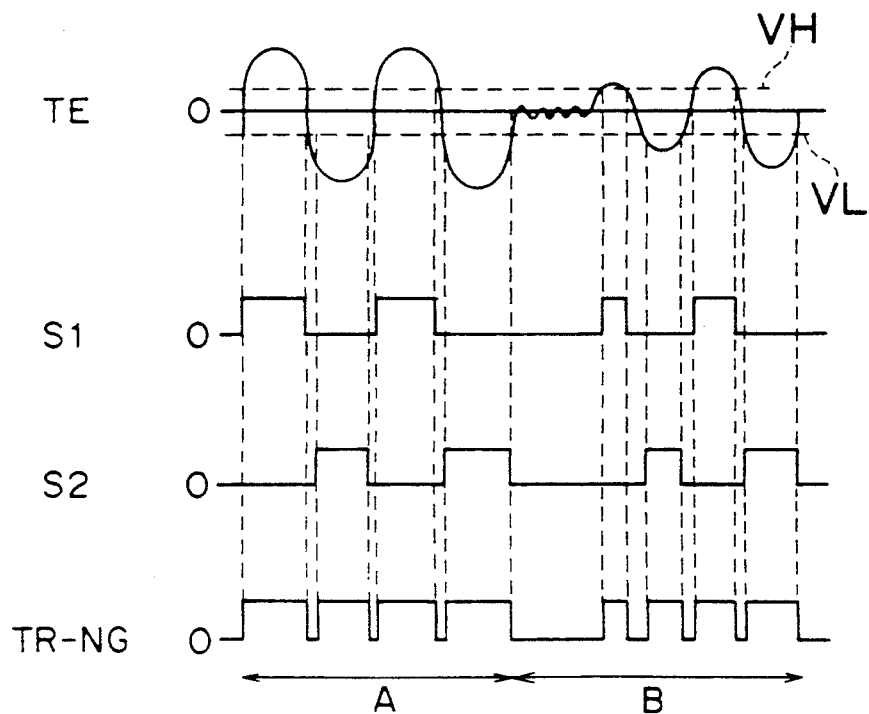
FIG. 14 is a waveform diagram describing the operation of the window comparator in the third embodiment of the invention.

The operation of the window comparator 316 is described below with reference to the waveform diagram in FIG. 14. Waveform TE in FIG. 14 is the tracking error signal TE. Tracking control and carrier control are inactive during period A, and are active during period B. It is to be noted that during period B tracking control is unstable, and the control system is oscillating. Waveforms S1 and S2 are the output waveforms from comparators 402 and 403. Waveform TR-NG is the OR circuit 406 output signal TR-NG. During tracking control system oscillation (period B), the output signal is intermittently HIGH, making it possible to detect tracking control system oscillation.

A window comparator 316 is provided to determine whether tracking control is operating normally. By applying current to the focus control coil 313 to generate heat only when tracking control is not operating normally and the temperature sensor 44 output temperature is low, heating when it is not necessary, such as may occur due to temperature sensor 44 detection errors and variations in the tracking actuator characteristics, will not occur. The time required for tracking control can therefore be reduced.

A temperature sensor 44 is provided in the present embodiment to enable heating only when the detected temperature is low, but this embodiment may also be constructed to heat, regardless of the temperature, whenever tracking control is not operating normally. In this case the temperature sensor 44 is unnecessary.

According to one modification of the third embodiment, it is possible to eliminate the temperature detector 44 and to heat the rubber 52 when the TR-NG signal is produced from the window comparator 316. According to this modification, the rubber 52 is heated whenever the tracking error signal is greater than a predetermined range.

In the second and third embodiments of the invention, current is applied to the focus control coil 313 to generate heat, but the tracking control coil 89 can also be used as a substitute for the focus control coil 313 or complementary thereto. A separate heating element can also be used.

Rubber 52 is used to provide a biasing force to the movable member 40, but any other biasing means, such as spring can be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A tracking control apparatus for controlling the tracking of a track on a recording carrier by an optical beam comprises:
    a track offset detection means for detecting an offset between the optical beam focused on the recording carrier and the actual track position and producing a tracking error signal based on said offset;
    a first shifting means for shifting, by a small amount from a neutral position, said optical beam focused on the recording carrier in a direction crossing the tracks, said first shifting means being applied with a biasing force to return to said neutral position;
    a first driving means, responsive to said tracking error signal, for driving said first shifting means against said biasing force to cancel said offset, but yielding a quasi-tracking error;
    a temperature detection means for detecting the temperature of said first shifting means;
    a simulation means, responsive to said tracking error signal, for simulating the movement of said first shifting means and producing a simulation signal indicative of the movement of said first shifting means;
    a control means, responsive to said temperature detecting means, for controlling said simulation means to change the simulation signal relative to the temperature of said first shifting means as detected by said temperature detecting means;
    a second shifting means for shifting said first shifting means in a direction crossing the tracks; and
    a second driving means, responsive to said simulation signal, for driving said second shifting means to cancel said quasi-tracking error.

2. A tracking control apparatus according to claim 1, wherein said first shifting means comprises a movable member pivotally mounted on a shaft and a biasing means for biasing said movable member to return to the neutral position.

3. A tracking control apparatus according to claim 1, wherein said simulation means is an equivalent filter.

4. A tracking control apparatus according to claim 1, wherein said simulation means change the simulation signal relatively to the temperature change when said second driving means is not operating.

5. A tracking control apparatus according to claim 1, wherein said control means provides to said simulation means coefficients which are changed in steps relatively to different temperature ranges.

6. A tracking control apparatus according to claim 1, further comprising a heating means for heating said first shifting means.

7. A tracking control apparatus according to claim 6, wherein said heating means heats said first shifting means before the operation of said second driving means.

8. A tracking control apparatus according to claim 6, wherein said heating means heats said first shifting means when the temperature of said first shifting means as detected by said temperature detecting means is below a predetermined low limit.

9. A tracking control apparatus according to claim 6, further comprising a determination means for detecting whether said tacking error signal level is within a predetermined range or not, and producing an error-operation signal when the tracking error signal level is not within said predetermined range for a predetermined time.

10. A tracking control apparatus according to claim 9, wherein said heating means heats said first shifting means when said error-operation signal is produced from said determination means.

11. A tracking control apparatus according to claim 9, wherein said heating means heats said first shifting means when said error-operation signal is produced from said determination means, and when the temperature of said first shifting means as detected by said temperature detecting means is below a predetermined low limit.

12. A tracking control apparatus according to claim 6, wherein said heating means comprises a coil used in said first driving means.

13. A tracking control apparatus according to claim 6, wherein said heating means comprises a coil used in a third shifting means for shifting said first shifting means to focus the optical beam on the recording carrier.

14. A tracking control apparatus according to claim 6, wherein a time for heating said first shifting means by said heating means varies according to the temperature of said first shifting means as detected by said temperature detecting means.

15. A tracking control apparatus for controlling the tracking of a track on a recording carrier by an optical beam comprises:
    a track offset detection means for detecting an offset between the optical beam focused on the recording carrier and the actual track position and producing a tacking error signal based on said offset;

a first shifting means for shifting, by a small amount from a neutral position, said optical beam focused on the recording carrier in a direction crossing the tracks, said first shifting means being applied with a biasing force to return to said neutral position;

a first driving means, responsive to said tracking error signal, for driving said first shifting means against said biasing force to cancel said offset, but yielding a quasi-tracking error;

a temperature detection means for detecting the temperature of said first shifting means;

a simulation means, responsive to said tracking error signal, for simulating the movement of said first shifting means and producing a simulation signal indicative of the movement of said first shifting means;

a heating means for heating said first shifting means to affect temperature characteristics of said first shifting means;

a control means, responsive to said temperature detecting means, for controlling said heating means to heat said first shifting means to reach a predetermined limit temperature;

a second shifting means for shifting said first shifting means in a direction crossing the tracks; and a second driving means, responsive to said simulation signal, for driving said second shifting means to cancel said quasi-tracking error.

16. A tracking control apparatus for controlling the tracking of a track on a recording carrier by an optical beam comprises:

a track offset detection means for detecting an offset between the optical beam focused on the recording carrier and the actual track position and producing a tacking error signal based on said offset;

a first shifting means for shifting, by a small amount from a neutral position, said optical beam focused on the recording carrier in a direction crossing the tracks, said first shifting means being applied with a biasing force to return to said neutral position;

a first driving means, responsive to said tracking error signal, for driving said first shifting means against said biasing force to cancel said offset, but yielding a quasi-tracking error;

a simulation means, responsive to said tracking error signal, for simulating the movement of said first shifting means and producing a simulation signal indicative of the movement of said first shifting means;

a heating means for heating said first shifting means to affect temperature characteristics of said first shifting means;

a control means for controlling said heating means to heat said first shifting means in response to an initial power supply to said tracking control apparatus;

a second shifting means for shifting said first shifting means in a direction crossing the tracks; and a second driving means, responsive to said simulation signal, for driving said second shifting means to cancel said quasi-tracking error.

17. A tracking control apparatus for controlling the tracking of a track on a recording carrier by an optical beam comprises:

a track offset detection means for detecting an offset between the optical beam focused on the recording carrier and the actual track position and producing a tracking error signal based on said offset;

a first shifting means for shifting, by a small amount from a neutral position, said optical beam focused on the recording carrier in a direction crossing the tracks, said first shifting means being applied with a biasing force to return to said neutral position;

a first driving means, responsive to said tracking error signal, for driving said first shifting means against said biasing force to cancel said offset, but yielding a quasi-tracking error;

a simulation means, responsive to said tracking error signal, for simulating the movement of said first shifting means and producing a simulation signal indicative of the movement of said first shifting means;

a heating means for heating said first shifting means to affect temperature characteristics of said first shifting means;

a determination means for detecting whether said tracking error signal level is within a predetermined range or not, and producing an error-operation signal when the tracking error signal level is not within said predetermined range for a predetermined time;

a control means for controlling said heating means to heat said first shifting means when said error-operation signal is produced from said determination means;

a second shifting means for shifting said first shifting means in a direction crossing the tracks; and a second driving means, responsive to said simulation signal, for driving said second shifting means to cancel said quasi-tracking error.

* * * * *

UNITED STATES PATENT AND TRADEMARK OFFICE
CERTIFICATE OF CORRECTION

PATENT NO.   : 5,331,615
DATED        : July 19, 1994
INVENTOR(S)  : Yamada et al.

It is certified that error appears in the above-identified patent and that said Letters Patent is hereby corrected as shown below:

Cover Page, [30] Foreign Application Priority Data, the filing date of Patent No. 3-288332 should be November 5, 1991.

Column 14, line 36, the word "tacking" should be --tracking--.

Column 15, line 2, the word "tacking" should be --tracking--.

Column 15, line 37, the word "tacking" should be --tracking--.

Signed and Sealed this

Twenty-second Day of November, 1994

*Attest:*

BRUCE LEHMAN

*Attesting Officer*       Commissioner of Patents and Trademarks